(12) United States Patent
Smadi et al.

(10) Patent No.: US 9,654,999 B2
(45) Date of Patent: May 16, 2017

(54) APPARATUS AND METHOD TO REDUCE A RATE OF RECEIVING DATA

(71) Applicant: BlackBerry Limited, Waterloo (CA)

(72) Inventors: Mohammed Nawaf Smadi, Ancaster (CA); Vytautas Robertas Kezys, Ancaster (CA); Ghada Badawy, Burlington (CA)

(73) Assignee: BlackBerry Limited, Waterloo, Ontario (CA)

( * ) Notice: Subject to any disclaimer, the term of this patent is extended or adjusted under 35 U.S.C. 154(b) by 354 days.

(21) Appl. No.: 14/310,616

(22) Filed: Jun. 20, 2014

(65) Prior Publication Data

US 2015/0373575 A1 Dec. 24, 2015

(51) Int. Cl.
*H04W 28/02* (2009.01)
*H04W 28/10* (2009.01)
*H04W 28/12* (2009.01)

(52) U.S. Cl.
CPC ....... *H04W 28/0215* (2013.01); *H04W 28/10* (2013.01); *H04W 28/12* (2013.01)

(58) Field of Classification Search
None
See application file for complete search history.

(56) References Cited

U.S. PATENT DOCUMENTS

| 5,109,515 | A | 4/1992 | Laggis et al. | |
|---|---|---|---|---|
| 2010/0111523 | A1 | 5/2010 | Hirth et al. | |
| 2010/0138549 | A1 | 6/2010 | Goel et al. | |
| 2012/0155518 | A1* | 6/2012 | Nakamura | H04L 1/0007 375/219 |
| 2013/0028092 | A1* | 1/2013 | Tong | H04L 47/26 370/236 |
| 2013/0329614 | A1* | 12/2013 | Thakur | H04W 52/0216 370/311 |

OTHER PUBLICATIONS

Minyoung Park, Uplink Channel Access, Intel Corp, May 2012, slide 6.*

* cited by examiner

*Primary Examiner* — Charles C Jiang
*Assistant Examiner* — Saad Khawar
(74) *Attorney, Agent, or Firm* — Thomas S. Grzesik; Fleit Gibbons Gutman Bongini & Bianco P.L.

(57) ABSTRACT

These teachings provide for transmitting to a wireless access point a sleep status indicator for a wireless transceiver. These teachings then provide for delaying having that wireless transceiver enter a sleep mode of operation until at least a predetermined period of time following transmission of the wireless transceiver sleep status indicator. These teachings also provide for determining a need to slow down a rate of receiving data from the wireless access point via the wireless transceiver. In this case the aforementioned sleep status indicator is transmitted in response to determining that need to slow down the rate of receiving data from the wireless access point.

20 Claims, 2 Drawing Sheets

APPARATUS AND METHOD TO REDUCE A RATE OF RECEIVING DATA

FIELD OF TECHNOLOGY

The present disclosure relates to electronic devices and in particular to electronic devices having data interfaces.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, so-called smartphones, wireless personal digital assistants (PDAs), and computers (including both laptop and pad/tablet-styled computers) having wireless local area network (WLAN) capabilities.

Many electronic devices having WLAN capability employ a corresponding WLAN chipset to support this capability. The WLAN chipset typically includes a wireless transceiver that utilizes one or more wireless protocols such as, but not limited to, an 802.11-family protocol, a Bluetooth protocol, and so forth. The WLAN chipset then also typically includes a non-wireless interface by which the WLAN chipset communicates with one or more other components such as a so-called System on a Chip (SoC). So configured, data as transmitted by a WLAN access point is received by the WLAN chipset via the wireless interface and passed along via the non-wireless interface.

In the past the non-wireless interface was inevitably faster than the wireless interface. With improvements over time, however, there are now wireless protocols having data-transmission bandwidths that exceed the bandwidths supported by many non-wireless interfaces. When the wireless transmissions are bursty, and the WLAN chipset has a useful amount of buffering capability, such a circumstance does not necessarily lead to problems. Instead, the WLAN chipset is able to buffer the incoming data and successfully provide that incoming data via the non-wireless interface notwithstanding that the incoming data is arriving faster than the non-wireless interface can accommodate.

When, however, the wireless traffic is more continuous and/or too voluminous, current buffering solutions can be inadequate to the task. In particular, at some point the WLAN chipset's buffer becomes filled and data packets are lost.

DETAILED DESCRIPTION

Figure 1:
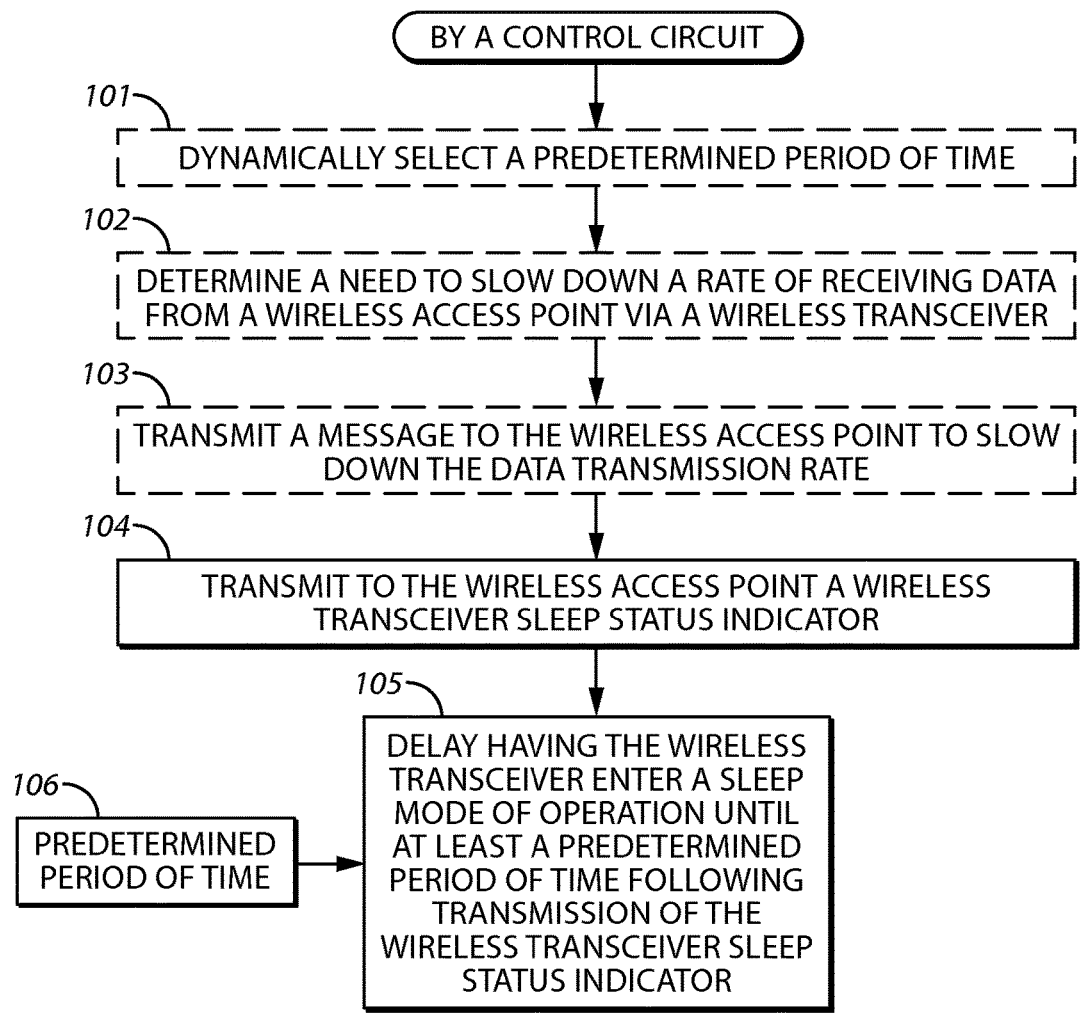
FIG. 1 is a flow diagram in accordance with the disclosure.

The following describes an apparatus and method pertaining to reducing a rate of receiving data. Generally speaking, these teachings provide for transmitting to a wireless access point a sleep status indicator for a wireless transceiver. These teachings then provide for delaying having that wireless transceiver enter a sleep mode of operation until at least a predetermined period of time following transmission of the wireless transceiver sleep status indicator.

By one approach these teachings also provide for determining a need to slow down a rate of receiving data from the wireless access point via the wireless transceiver. In this case the aforementioned sleep status indicator is transmitted in response to determining that need to slow down the rate of receiving data from the wireless access point.

So configured, the sleep capability of the wireless transceiver is used to meter and otherwise control transmissions of the wireless access point to prevent the wireless access point's transmissions from causing the wireless transceiver's buffers to overflow. By delaying the sleep state of the wireless transceiver, the wireless transceiver remains available to receive the presently-queued transmissions that the wireless access point will transmit notwithstanding its own cessation of transmissions upon receiving the sleep status indicator. So configured, the wireless transceiver can successfully receive such transmissions and avoid the necessity of re-transmitting such data upon exiting the sleep state.

These teachings are highly flexible in practice and will accommodate a wide variety of modifications as appropriate to a given application setting. These teachings can also be readily employed in combination with other rate-control methodologies if desired. For example, these teachings will also accommodate responding to the determined need to slow down the rate of receiving data from the wireless access point by transmitting a Modulation coding scheme Feedback (MFB) message (as per an 802.11n-compatible standard) to the wireless access point to cause the wireless access point to employ a reduced rate of transmitting data. As another example in these regards these teachings will also accommodate responding to the determined need to slow down the rate of receiving data from the wireless access point by transmitting a message to the wireless access point to cause the wireless access point to utilize smaller-sized data packets.

These teachings are readily employed with existing WLAN chipsets and can help to leverage the present availability and cost-effectiveness of such components. In particular, these teachings permit these existing, cost-effective solutions to remain commercially viable notwithstanding the relatively slower speed of their non-wireless interfaces.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents a process 100 that illustrates by way of example various approaches that accord with these teachings. It shall be understood that specific examples provided herein are offered by way of illustration and are not to be taken as indications of any particular limitations with respect to the scope of these teachings. In this description, and for the sake of an example, it will be presumed that a control circuit of choice carries out this process 100.

Figure 2:
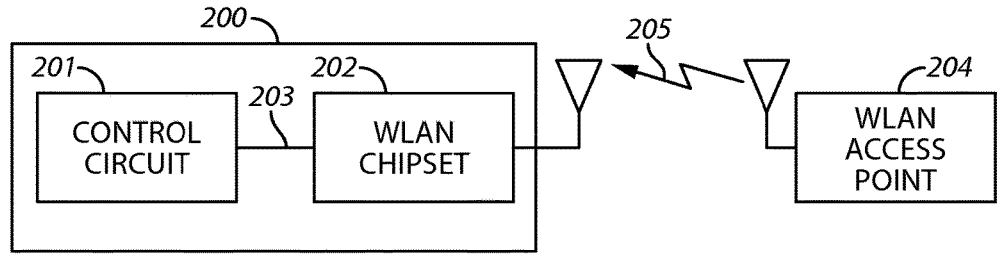
FIG. 2 is a block diagram in accordance with the disclosure.

Referring momentarily to FIG. 2, this control circuit 201 can comprise a part of, for example, an apparatus 200 such as a so-called smart phone or tablet/pad-styled computer. In this example this apparatus 200 also includes a wireless transceiver such as a wireless local area network transceiver (specifically in this example, a WLAN chipset 202) that operably couples to the control circuit 201. By one approach this operable coupling permits the WLAN chipset 202 to communicate received data to the control circuit 201 and/or status information regarding, for example, a present state of one or more received-data buffers as comprise a part of the WLAN chipset 202. In any event, this operable coupling permits the control circuit 201 to provide instructions to the WLAN chipset 202.

So configured, the apparatus 200 can receive data via the WLAN chipset 202 as transmitted by a WLAN access point 204 via a corresponding wireless channel 205. By way of example, this WLAN access point 204 can transmit using at least one 802.11-family protocol. In such a case, the WLAN chipset 202 can be configured to transceive compatibly using that protocol.

Such components are well understood in the art. Such a control circuit 201, for example, can comprise a fixed-purpose hard-wired platform or can comprise a partially or wholly programmable platform. Similarly, the control circuit 201 can comprise an application processor that itself comprises a System-on-a-Chip (SoC). These architectural options are well known and understood in the art and require no further description here. This control circuit 201 is configured (for example, by using corresponding programming as will be well understood by those skilled in the art) to carry out one or more of the steps, actions, and/or functions described herein.

With continued reference to both FIGS. 1 and 2, at optional block 102 the control circuit 201 determines a need to slow down a rate of receiving data from the wireless access point (i.e., the WLAN access point 204) via the wireless transceiver (i.e., the WLAN chipset 202). These teachings will accommodate a variety of approaches in these regards. By one approach, for example, the control circuit 201 monitors the capacity state of one or more buffers in the WLAN chipset 202. In such a case this determination can be based upon the monitored buffer having become filled to at least a certain threshold level. As another related example, in lieu of the foregoing or in combination therewith, this determination can be based at least in part upon a rate at which the monitored buffer fills.

By one approach the WLAN chipset 202 reports such buffer information to the control circuit 201. The WLAN chipset 202 may report this information unilaterally on a periodic basis and/or when and as the buffer capacity and/or rate at which the buffer fills reaches a particular reporting threshold. By another approach, in lieu of the foregoing or in combination therewith, the control circuit 201 may proactively interrogate the WLAN chipset 202 to request such information.

These teachings are highly flexible in practice and will accommodate other approaches in these regards as well. For example, a data monitor component (not shown) may independently and transparently monitor the flow of data into the WLAN chipset 202 and provide corresponding reports to the control circuit 201.

At optional block 103, and in response to determining the need to slow down the rate of receiving data from the wireless access point via the wireless transceiver, this process 100 will accommodate transmitting a message to the wireless access point to slow down the data transmission rate. As one example in these regards, this message can comprise a Modulation coding scheme FeedBack (MFB) message as per an 802.11n-compatible standard. This MFB message is known in the art and serves to cause a receiving wireless access point to employ a reduced rate of data transmission.

As another example in these regards, this message can serve to cause the wireless access point to utilize smaller-sized data packets to thereby slow down the effective data throughput rate. By one approach this comprises using the Maximum Aggregation Media Access Control (MAC) Protocol Data Unit (A-MPDU) Length Exponent field in a Very High Throughput (VHT) capabilities element. A component uses this field to inform the receiver of the maximum A-MPDU length that it can receive. The Maximum A-MPDU Length Exponent field is an integer in the range of 0 to 7 and the maximum A-MPDU length is calculated from its contents as follows:

$$\text{Max } A\text{-MPDU length} = 2^{(13+\textit{Maximum A-MPDU Length Exponent})} - 1$$

The IEEE 802.11n-2009 standard states that a sender should not transmit an A-MPDU that is longer than the value indicated by the Maximum A-MPDU Length Exponent field in the VHT Capabilities element received from the intended receiver. Decreasing the Maximum A-MPDU Length Exponent field value will force the AP to send smaller data packets to the client which will lower the throughput and hence lower the likelihood of buffer overflows at the client WLAN chipset.

Although the foregoing optional approaches may help to resolve a particular momentary operating instance, either in full or in part, it is also possible that such approaches will be insufficient or at least partially unsatisfactory in some regard or another. Accordingly, this process 100 also provides, at block 104, for transmitting to the wireless access point a wireless transceiver sleep status indicator. This sleep status indicator can indicate, for example, that the WLAN chipset 202 is going to sleep. Sleep refers to a low power mode for electronic devices such as computers and portable communication devices. When placed in sleep mode, the electronic device will typically cut power to unneeded subsystems and place memory into a minimum power state (typically just sufficient to retain its data).

In many application settings it will be the wireless transceiver itself (i.e., the WLAN chipset 202 in the present example) that transmits this sleep status indicator. That said, these teachings anticipate and will accommodate having the control circuit 201 instruct the wireless transceiver to make this transmission. In other words, these teachings will accommodate having the wireless transceiver transmit this particular message without itself having independently and unilaterally determined to enter a sleep state.

Upon receiving such a sleep status indicator the wireless access point (i.e., the WLAN access point 204 in the present example) will halt the transmission of data to the wireless transceiver with one notable exception; data already queued in a transmit buffer will typically still be transmitted notwithstanding reception of the sleep status indicator. To accommodate this circumstance, at block 105 the wireless transceiver will delay entering the sleep mode of operation until at least a predetermined period of time 106 following transmission of the wireless transceiver sleep status indicator.

Generally speaking, this predetermined period of time 106 will be sufficient to permit the wireless access point 204 to transmit and clear the aforementioned transmission buffer/queue. In some cases this predetermined period of time 106 can be static and fixed for all use cases. As one example in these regards, the predetermined period of time 106 can be at least (or no more than) 10 ms. As another example in these regards, the predetermined period of time 106 can be at least (or no more than) 30 ms.

These teachings will also accommodate, however, a more dynamic and flexible approach in these regards. As but one example in these regards, at block 101 the control circuit can dynamically select a predetermined period of time 106. This dynamic selection may be based, for example, upon specific information that may be available to the control circuit 201 with respect to the operating parameters of the wireless access point. As another example, the control circuit 201 may maintain and access store historical records regarding the use of various predetermined periods of time to thereby develop and use, over time, a custom and dynamically-determined period of time that is particularly useful with a particular wireless access point.

Figure 3:
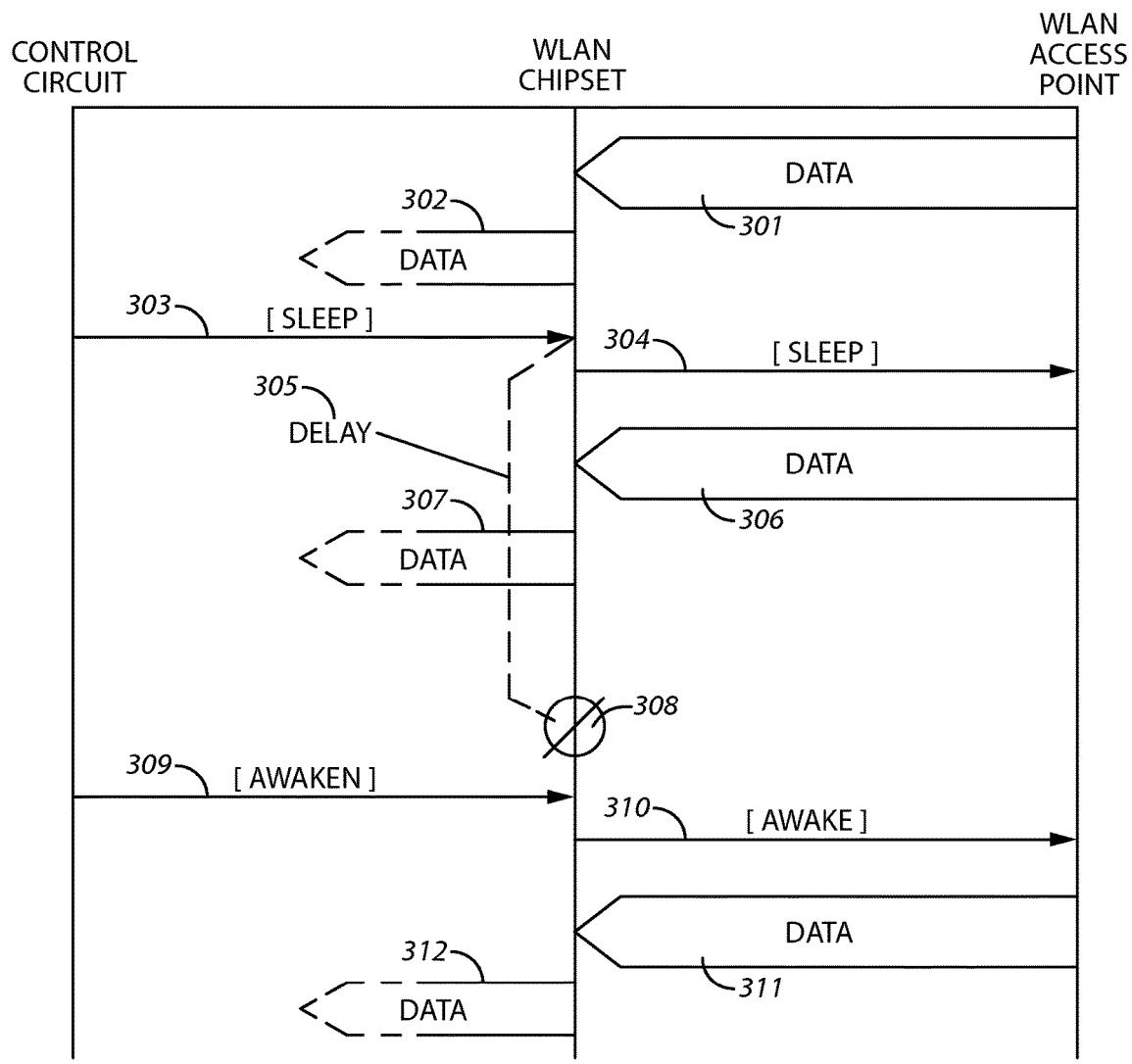
FIG. 3 is a call flow diagram in accordance with the disclosure.

FIG. 3 presents an illustrative example in the foregoing regards. In this example a WLAN access point transmits data 301 via a wireless interface at a given throughput rate to a WLAN chipset. The WLAN chipset then retransmits that data 302 via a non-wireless interface at a throughput rate that is less than the throughput rate employed by the WLAN access point. In response to determining that the buffer of the WLAN chipset may overflow under these conditions, a control circuit issues a sleep command 303 to the WLAN chipset.

The WLAN chipset then responsively transmits a sleep status indicator 304 to the WLAN access point but itself delays 305 entering a sleep mode of operation 308. In the meantime, the WLAN access point empties its transmission queue by transmitting previously-queued data 306. Not having yet entered a sleep mode of operation 308, the WLAN chipset receives that data 306 and retransmits that data 307 via its non-wireless interface before entering the sleep mode of operation 308.

In this illustrative example the control circuit 309 then issues an awaken command 309 to the WLAN chipset. The latter responsively forwards a sleep status indicator message 310 to the WLAN access point indicating its own wake status. The WLAN access point responds by again transmitting data 311 which the WLAN chipset again processes and retransmits 312 per its ordinary operational functionality.

In the example above the WLAN chipset delays its own entry into a sleep mode of operation. Such an approach is suitable for use with a WLAN chipset having a programmable parameter in these regards. When such is not the case, these teachings will accommodate having the control circuit first instruct the WLAN chipset to send the sleep status message 304 and to then transmit subsequently, following the period of predetermined delay 305, a follow-on instruction to the WLAN chipset to instruct the latter to enter the sleep mode of operation 308.

So configured, the control circuit 201 has at least one way, and if desired a plurality of different ways, to prevent the WLAN chipset 202 from overflowing its buffers when too much data is arriving too quickly via a wireless interface as compared to the data throughput rate by which the WLAN chipset 202 can forward that data to, for example, an application processor of choice. Importantly, these teachings can be readily deployed for use with existing chipsets and component designs without requiring redesign or reprogramming of those chipsets. Accordingly, these teachings forestall the commercial obsolescence of such components and can help contribute to economies of scale that benefit the user.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An apparatus comprising:
   an application processor;
   a wireless transceiver that operably couples to the application processor via a data interface; the apparatus configured to:
   transmit to a wireless access point, via the wireless transceiver, a wireless transceiver sleep status indicator;
   delay having the wireless transceiver enter a sleep mode of operation until at least a predetermined period of time following transmission of the wireless transceiver sleep status indicator, wherein the predetermined period of time is selected only by the apparatus and maintained locally by the apparatus, wherein the predetermined period of time is unknown to the wireless access point; receive, by the wireless transceiver, data from the wireless access point during the predetermined period of time; and
   transmit, by the wireless transceiver, an additional wireless transceiver sleep status indicator to the wireless access point after receiving the data.

2. The apparatus of claim 1 wherein the wireless transceiver comprises a wireless local area network transceiver.

3. The apparatus of claim 2 wherein the wireless local area network transceiver is configured to transceive compatibly using at least one 802.11-family protocol.

4. The apparatus of claim 1 wherein the application processor comprises a System-on-a-Chip (SoC) and wherein the wireless transceiver is physically discrete from the SoC.

5. The apparatus of claim 1 wherein the wireless transceiver sleep status indicator indicates that the wireless transceiver is going to sleep.

6. The apparatus of claim 1 wherein the predetermined period of time is at least 10 ms.

7. The apparatus of claim 6 wherein the predetermined period of time is at least 30 ms.

8. The apparatus of claim 1 wherein the apparatus is further configured to:
   dynamically select the predetermined period of time.

9. The apparatus of claim 1 wherein the apparatus is further configured to:
   determine a need to slow down a rate of receiving data from a wireless access point via the wireless transceiver;
   and wherein the apparatus is configured to transmit the wireless transceiver sleep status indicator in response to determining the need to slow down the rate of receiving data from the wireless access point.

10. The apparatus of claim 9 wherein the apparatus is further configured to:
    also respond to determining the need to slow down the rate of receiving data from the wireless access point by transmitting a Modulation coding scheme FeedBack (MFB) message (as per an 802.11n-compatible standard) to the wireless access point to cause the wireless access point to employ a reduced rate of transmitting data.

11. The apparatus of claim 9 wherein the apparatus is further configured to:

also respond to determining the need to slow down the rate of receiving data from the wireless access point by transmitting a message to the wireless access point to cause the wireless access point to utilize smaller-sized data packets.

12. A method comprising:

by a control circuit of an apparatus that is separate and distinct from a wireless transceiver of the apparatus:

determining that one or more conditions have been satisfied for the wireless transceiver to enter a sleep mode of operation;

instructing the wireless transceiver to transmit a wireless transceiver sleep status indicator to a wireless access point, wherein the wireless transceiver transmits the wireless transceiver sleep status indicator in response to being instructed by the control circuit, and wherein the wireless transceiver operably couples to an application processor via a data interface;

delaying having the wireless transceiver enter a sleep mode of operation until at least a predetermined period of time following transmission of the wireless transceiver sleep status indicator, wherein the predetermined period of time is selected only by the apparatus and maintained locally by the apparatus, wherein the predetermined period of time is unknown to the wireless access point; receiving, by the wireless transceiver, data from the wireless access point during the predetermined period of time; and transmit, by the wireless transceiver, an additional wireless transceiver sleep status indicator to the wireless access point after receiving the data.

13. The method of claim 12 wherein the wireless transceiver comprises a wireless local area network transceiver.

14. The method of claim 12 wherein the application processor comprises a System-on-a-Chip (SoC) and wherein the wireless transceiver is physically discrete from the SoC.

15. The method of claim 12 wherein the wireless transceiver sleep status indicator indicates that the wireless transceiver is going to sleep.

16. The method of claim 12 wherein the predetermined period of time is at least 10 ms.

17. The method of claim 12 wherein the method further comprises:

dynamically selecting the predetermined period of time.

18. The method of claim 12 wherein the method further comprises:

determining a need to slow down a rate of receiving data from a wireless access point via the wireless transceiver;

and wherein transmitting the wireless transceiver sleep status indicator comprises transmitting the wireless transceiver sleep status indicator in response to determining the need to slow down the rate of receiving data from the wireless access point.

19. The method of claim 18 wherein the method further comprises:

also responding to determining the need to slow down the rate of receiving data from the wireless access point by transmitting a Modulation coding scheme FeedBack (MFB) message (as per an 802.11n-compatible standard) to the wireless access point to cause the wireless access point to employ a reduced rate of transmitting data.

20. The method of claim 18 wherein the method further comprises:

also responding to determining the need to slow down the rate of receiving data from the wireless access point by transmitting a message to the wireless access point to cause the wireless access point to utilize smaller-sized data packets.

* * * * *